United States Patent [19]
Jensen

[11] Patent Number: 5,272,239
[45] Date of Patent: Dec. 21, 1993

[54] SILICON-FILLED ALUMINUM POLYMER PRECURSORS TO SIC-ALN CERAMICS

[76] Inventor: James A. Jensen, 544 Cabot Dr., Hickory Hill, Hockessin, Del. 19707

[21] Appl. No.: 860,783

[22] Filed: Mar. 24, 1992

[51] Int. Cl.$^5$ .................................... C08G 79/00
[52] U.S. Cl. ................................ 528/9; 501/89; 501/92
[58] Field of Search ............... 501/88, 89, 92, 96, 501/97, 98; 423/412, 348, 354; 528/9

[56] References Cited

U.S. PATENT DOCUMENTS

| | | | |
|---|---|---|---|
| 3,492,153 | 1/1970 | Ervin | 117/106 |
| 4,141,740 | 2/1979 | Cutler et al. | 106/44 |
| 4,514,555 | 4/1985 | Taniguchi et al. | 528/9 |
| 4,533,645 | 8/1985 | Huseby et al. | 501/96 |
| 4,687,657 | 8/1987 | Clark et al. | 423/412 |
| 4,816,428 | 3/1989 | Kishi et al. | 501/89 |
| 4,904,424 | 2/1990 | Johnson | 264/29.2 |
| 5,041,512 | 8/1991 | Tebbe | 528/9 |
| 5,061,663 | 10/1991 | Bolt et al. | 501/95 |

OTHER PUBLICATIONS

Rafaniello, et al, Fabrication and characterization of SIC-AlN alloys, J. Mater. Sci., 1981, 16, pp. 3479-3488.
Bentsen, Hasselman & Ruh, Effect of Hot-Pressing Temp. on the Thermal Diffusivity/Conductivity of SiC/AlN Comp., J. Am. Cer. Soc., 1983, pp. C40-C41.
Zangvil and Ruh, Composition and Properties of Hot--Pressed SiC-AlN Solid Solutions, J. Am. Ceram. Soc., 1982, 66, pp. 260-265.
Zangvil and Ruh, Phase Relationships in the Silicon Carbide-Aluminum Nitride System, J. Am. Ceram. Soc., 1988, 71, pp. 884-890.
W-C. J. Wei and R-R. Lee, Pressureless sintering of AlN-SiC composites J. Mater. Sci., 1991, 26, pp. 2930-2936.
W-C. J. Wei and R-R. Lee, Fabrication, Microstructure, and Properties of SiC-AlN Ceramic Alloys, Ceram. Eng. Sci. Proc., 1990, 11, pp. 1094-1121.
C. L. Czekja et al., Preparation of Silicon Carbide/Aluminum Nitride Ceram. Using Organo. Precursors, J. Am. Ceram. Soc., 1990, 73, pp. 352-357.
J. F. Janik et al., Recations of Tris (trimethylsilyl) aluminum and Amonia, Formation, Structure, etc., Inorg.
Y. Sugahara et al., The formation of SiC-AlN solid solution by the carbothermal, etc., J. Mater. Sci. Lett., 1988, 7, pp. 795-797.
M. Mitomo et al., Preparation of a composite powder of the system SiC-AlN, J. Mater. Sci. Lett., 1988, 7, pp. 1151-1153.
Shih-Yee Kuo, et al., Morphology of Phase Separation in AlN-Al$_2$OC and SiC-AlN Ceramics, J. Am. Ceram. Soc., 1990, 73 (9), pp. 2640-2646.

*Primary Examiner*—Karl Group
*Assistant Examiner*—A. Wright

[57] ABSTRACT

Process for producing ceramic compositions by dispersing elemental silicon powder in a ceramic precursor polymer containing Al, N, and C, shaping the resultant composition, and heating the shaped product to cause a reaction between the elemental silicon and the polymer to result in an intermediate composition and further heating the intermediate composition to a temperature sufficient to consolidate the char to a dense SiC—AlN solid-solution or microscopic ceramic.

34 Claims, No Drawings

SILICON-FILLED ALUMINUM POLYMER PRECURSORS TO SIC-AlN CERAMICS

FIELD OF THE INVENTION

The present invention relates to a method of preparing precursors for silicon carbide aluminum nitride (SiC—AlN) solid solutions and composites by mixing an alazane polymer, i.e., a polyalazane, with elemental silicon powder. The silicon-filled alazane polymer precursors can be formed into films, fibers, coatings and molded objects.

DISCUSSION OF BACKGROUND INFORMATION

Ceramic materials are of critical importance for a number of high temperature, high performance applications. These high temperature and high performance applications require a unique combination of properties, such as high specific strength, high temperature mechanical property retention, hardness, wear resistance, and chemical inertness, as well as low thermal and electrical conductivity.

Silicon carbide (SiC) has potential for use in high temperature structural applications because it possesses high temperature strength, oxidation and corrosion resistance, and low bulk density; however, microstructural instability at elevated temperatures often limits the use of SiC in many such applications. The morphology of SiC formed at low temperatures is cubic (beta-SiC, 3C). At higher temperatures alpha-SiC, which can have either hexagonal (alpha SiC 2H, 4H, 6H) or rhombohedral (alpha-SiC 15R, 21R) morphologies, forms. Also, at higher temperatures beta-SiC transforms into alpha-SiC. These various polytypes can undergo one or more phase transformations between 1400° C. and 2200° C., often resulting in brittle failure of the ceramic under structural loading.

Virkar, et.al. *J. Mater. Sci.*, 1981, 16, 3479 have shown that the presence of 1% to 10% aluminum nitride (AlN) in hot-pressed SiC samples results in sintered parts having reduced grain size and improved microstructural uniformity. These phenomena have been attributed to the formation of solid solutions of the AlN in the SiC ceramic. In order to form an extensive solid solution, two materials must have substantially the same crystal structure, the same crystalline phase, and similar atomic or ionic sizes. The hexagonal wurtzite phase of AlN is isostructural with the 2H form of SiC and is closely lattice-matched. Consequently, AlN readily forms solid solutions with SiC and imparts phase stabilization during thermal cycling.

SiC—AlN composite and solid solution materials with a wide range of compositions have now been reported Representative examples include: Virkar, et. al. *J. Mater. Sci.*, 1981, 16, 3479; A. Zangvil and R. Ruh in *J. Am. Ceram. Soc.*, 1982, 66, 260-265, and in *J. Am. Ceram. Soc.*, 1988, 71, 884-890; W-C. J. Wei and R-R. Lee in *J. Mater. Sci.*, 1991, 26, 2930 and *Ceram. Eng. Sci. Proc.*, 1990, 11, 1094; U.S. Pat. No. 4,141,740; and U.S. Pat. No. 3,259,509. Such SiC—AlN alloys have been shown to possess superior creep resistance, improved fracture toughness and, possibly, enhanced oxidation and corrosion resistance. In addition, the potential to vary properties such as band gap width, thermal conductivity, and thermal expansion over the range of SiC—AlN solid solution compositions makes this system attractive for many electronic applications.

The formation of dense bodies of SiC—AlN solid solutions from a mixture of SiC and AlN powder requires not only powder consolidation (sintering), but also thorough solid-state diffusion of the AlN into the SiC microstructure. The high melting points and low solid state diffusivities of both AlN and SiC, however, have limited the use of solid solution SiC—AlN ceramics. As a result, consolidated samples having representative properties have, for the most part, been prepared by pressure-assisted densification methods, e.g. hot-pressing, at relatively high temperatures of about 2200° C. Such techniques are energy-inefficient and severely limit the shape-complexity of the part which can be fabricated.

A wide range of ceramic compositions, however, have now been prepared from metal organic polymer precursors. Since these polymer materials can often be formed using such conventional plastics forming techniques as coating, extrusion, and fiber spinning, a variety of intricately shaped refractory articles have been fabricated. An added advantage in the use of such polymers is their chemical reactivity. Often low temperature chemical reactions involving thermal decomposition of the polymer can be used to establish the sintered stoichiometry of the desired part in situ.

W. Rafaniello, K. Cho, and A. V. Virkar, *J. Mater. Sci.*, 1981, 16, 3479-3488 formed SiC—AlN alloys by the carbothermal reduction of silica and alumina derived from an intimate mixture of silica, aluminum chloride, and starch. The resulting SiC—AlN powder was hot pressed, without additives, to high density.

L. D. Bentsen, D. P. H. Hasselman, and R. Ruh, *J. Am. Ceram. Soc.*, 1983, 66, C40-C41 prepared SiC—AlN solid solutions by hot-pressing mixtures of SiC and AlN powders at 1700° C. to 2200° C. Specimens hot-pressed at the lower temperatures were reported to consist of composites comprising mixtures of SiC and AlN grains with only slight interdiffusion; whereas, specimens prepared at the highest temperatures were solid solutions resulting from the interdiffusion between the two components.

A. Zangvil and R. Ruh in *J. Am. Ceram. Soc.*, 1982, 66, 260-265, and in *J. Am. Ceram. Soc.*, 1988, 71, 884-890 describe solid solutions of SiC—AlN prepared by hot-pressing powder mixtures of silicon carbide and aluminum nitride in the temperature range 1700° C. to 2300° C.

W-C. J. Wei and R-R. Lee in *J. Mater. Sci.*, 1991, 26, 2930 and *Ceram. Eng. Sci. Proc.*, 1990, 11, 1094 describe pressureless sintered SiC/AlN composites prepared from SiC and AlN powders containing up to 4 weight % oxide sintering aids.

J. F. Janik et al., *Inorg. Chem.*, 1987, 26, 4341-4345 reported the synthesis of the dimer $\{[(CH_3)_3Si]_2AlNH_2\}_2$ by combining $[(CH_3)_3Si]_3Al—O(C_2H_5)_2$ and ammonia in a 1:1 ratio. Upon pyrolysis in ammonia at 900° C., a solid mixture of AlN/SiC forms. Variations of the reaction stoichiometry to 2:1 ammonia to $[(CH_3)_3Si]_3Al—O(C_2H_5)_2$ or addition of one equivalent of ammonia to $\{[(CH_3)_3Si]_2AlNH_2\}_2$ results in the crystalline solid compound $Al\{[(CH_3)_3Si]_2Al(NH_2)_2\}_3$. Pyrolysis of this compound at 930° C. in ammonia gives a mixture of AlN/SiC. The report describes a discrete molecular compound as a precursor to SiC—AlN rather than an elemental silicon powder-filled polymer precursor system. The compound contains both Al—Si and Al—N bonds.

C. L. Czekja et al., in *J. Am. Ceram. Soc.*, 1990, 73, 352-357, report the preparation of silicon carbide aluminum nitride ceramics from polymer precursors. Pyrolysis of mixtures of the carbosilane polymers [((CH$_3$)$_3$Si)$_{0.80}$((CH$_2$=CH)CH$_3$Si)$_{1.0}$(CH$_3$HSi)$_{0.35}$]$_n$, or [CH$_3$HSiCH$_2$]$_n$ with the aluminum amide compound [R$_2$AlNH$_2$]$_3$ where R=C$_2$H$_5$, or i—C$_4$H$_9$ yield solid solutions of 2H—SiC—AlN or SiC/AlN composites.

U.S. Pat. No. 4,687,657, T. J. Clark and R. E. Johnson, Celanese Corp., Aug. 18, 1987, formed a SiC—AlN solid solution by mixing a preceramic organosilicon polymer capable of being pyrolyzed to silicon carbide, and a preceramic organoaluminum polymer capable of being pyrolyzed to aluminum nitride, and pyrolyzing the mixed polymer composition at a temperature above 1000° C. in an inert atmosphere. The silicon source employed was solely organosilicon polymers, such as poly(diorganosilanes), poly(haloorganosilanes), and poly(carbosilanes). The '657 patent discloses a method of producing SiC and AlN ceramic alloys from preceramic organic polymers by mixing a solution of a polycarbosilane with a solution of poly(N-alkylaminoalane), (HAl—NR)$_n$' where R is an aliphatic, cycloaliphatic or aromatic hydrocarbon and n is a whole number lower than or equal to 10, and removing the solvent from the mixture of polymers and heating the solid polymeric mixture to effect the conversion of the polymers to a ceramic product.

Y. Sugahara, K-I. Sugimoto, H. Takagi, K. Kuroda, and C. Kato in *J. Mater. Sci. Lett*, 1988, 7, 795-797 prepared a SiC—AlN solid solution from the carbothermal reduction of a montmorillonite-polyacrylonitrile intercalation compound. The montmorillonite supplies a fixed ratio of silicon oxide, in the form of SiO$_2$, to aluminum as the oxide Al$_2$O$_3$. The intercalation compound formed from the aluminosilicate mineral, montmorillonite, and polyacrylonitrile was decarbonized under nitrogen at 650° C., followed by pyrolysis at 1670° C.

M. Mitomo, M. Tsutsumi, and Y. Kishi, *J. Mater. Sci. Lett*, 1988, 7, 1151-1153 prepared a SiC—AlN composite powder by carbothermal reduction, in nitrogen, of a mixture of SiO$_2$, Al$_2$O$_3$, and carbon at 1500° C. The silica and alumina were prepared from a 1:1 ratio of Si(OC$_2$H$_5$)$_4$ and Al[OCH(CH$_3$)$_2$]$_3$ by hydrolysis in a solution containing carbon black.

U.S. Pat. No. 3,492,153, G. Ervin, Jr., North American Rockwell Corp., Jan. 27, 1970 described a process for preparing a high density silicon carbide-aluminum nitride refractory composition by deposition of aluminum nitride, from the vapor state, in the pores of a silicon carbide body. Preferably, the aluminum nitride was formed in situ in the pores of the silicon carbide body by heating the body at a temperature between 1400° C. and 2200° C. in an atmosphere containing nitrogen and vaporized aluminum. The aluminum was introduced, either as the metal or as aluminum trichloride, in the presence of ammonia. Ervin, Jr. '153, prepares a ceramic composite of AlN and SiC by taking a porous SiC preform and impregnating the preform with aluminum vapor, followed by firing.

U.S. Pat. No. 4,141,740, I. E. Cutler and P. D. Miller, University of Utah, Feb. 27, 1979, describe a solid solution ceramic and a process for preparing a solid solution ceramic including silicon carbide, aluminum oxycarbide, and aluminum nitride from intimate mixtures of fume type silica, aluminum salts and starch, or kaolinite clay and starch. The samples were dried and coked at 600° C., then fired at 1500° C. under nitrogen.

U.S. Pat. No. 4,904,424, R. E. Johnson, Hoechst Celanese Corp., Feb. 27, 1990, describes the formation of ceramic alloys or solid solutions formed by dispersing a powdery metal alloy or intimate mixture of two alloying metals in a precarbonaceous polymer such as polyacrylonitrile. The powdery metal alloys are selected from silicon, boron, and compounds of silicon or boron, with a second alloying metal comprising aluminum.

SUMMARY OF THE INVENTION

The present invention is directed to preparing precursors for silicon carbide-aluminum nitride ceramics by providing mixtures of an alazane polymer, i.e., a polyalazane, with elemental silicon powder.

As used herein, alazane polymers (also referred to herein as polyalazanes) are aluminum containing dimers, oligomers or polymers comprising aluminum, nitrogen and carbon with aluminum-nitrogen bonds, such as aluminum amides, aluminum imides, aluminum imines and aminoalanes. The alazane polymer forms AlN upon pyrolysis and supplies a carbon source for the reactive silicon powder filler phase.

In accordance with the present invention, the solid elemental silicon powder filler is mixed with or suspended in the alazane polymer, which can be in the form of a liquid or solid, whereby the elemental silicon filler powder is essentially coated by or in intimate contact with the AlN forming alazane polymer.

One object of this invention is to provide a method for preparing SiC—AlN ceramic composites, or solid solution SiC—AlN ceramics in situ by chemically reacting a ceramic precursor polymer containing Al, N, and C with elemental silicon.

It is a further object of this invention to provide a composition comprising a metal organic polymer and elemental silicon powder which can be used in the process of forming solid-solution and composite SiC—AlN ceramics.

The present invention, therefore, relates to compositions comprising a mixture of a ceramic precursor polymer containing Al, N, and C and elemental silicon, preferably elemental silicon powder, which chemically react at elevated temperatures to give compositions which can be fired to solid-solution and composite SiC-/AlN ceramics. The present invention also relates to a process for forming SiC/AlN solid solution and composite ceramics by (1) filling a ceramic precursor polymer containing Al, N, and C with elemental silicon powder, (2) performing a controlled thermolysis to effect a chemical disproportionation of the polymer in the presence of the elemental silicon and concomitantly forming silicon carbon bonds, and (3) sintering the resulting reaction product.

Possible applications for this polymer precursor route to SiC—AlN solid solutions and composites includes formation of films, fibers, coatings, and three dimensional massive objects or composites which are formed by processes such as injection molding, extrusion, and infiltration of porous preforms.

With the foregoing in mind, the present invention is generally directed to a process for preparing a composition which involves reacting a polymer comprising aluminum, nitrogen, and carbon with elemental silicon in predetermined proportions in specific atmospheres at a temperature and for a time sufficient to form a reaction product having a carbon silicon bond.

For the process of the present invention, the initial stage of the reaction is performed at an initial temperature including a temperature within a temperature range having an upper limit of less than about 1650° C., and preferably within the range of about 400° C. to about 1650° C.; and in an atmosphere which is non-oxidizing. By non-oxidizing is meant inert or reducing atmospheres. Representative inert atmospheres include helium, neon, argon, krypton, and xenon. Representative reducing atmospheres include hydrogen and ammonia.

The process of the present invention also involves subjecting the previously formed reaction product to a higher temperature than the initial temperature to form a ceramic composition comprising aluminum nitride and silicon carbide in proper proportions for the desired stoichiometry, wherein the higher temperature includes a temperature within a higher temperature range having an upper limit of about 2300° C., and preferably, within a temperature range of about 1650° C. to about 2000° C. and the atmosphere is a non-oxidizing atmosphere. In accordance with the present invention, the initial step of reacting effects a chemical disproportionation of the polymer in the presence of the elemental silicon to form the reaction product; and the subsequent step of subjecting the reaction product to the higher temperature effects a sintering of the reaction product to produce a ceramic.

The resultant ceramic may be composed of various proportions of silicon carbide and aluminum nitride in a form selected from the group consisting of a solid-solution and a composite, the latter preferably being a microcomposite. By microcomposite is meant a composite wherein discrete particulate domains of AlN and SiC are homogeneously interdispered at the micron to submicron level.

In a preferred embodiment, the predetermined proportions of the silicon carbide and aluminum nitride include a sufficient excess of the elemental silicon to result in a ceramic having residual elemental silicon, in which case the process further comprises nitriding the residual elemental silicon in an atmosphere comprising a member selected from the group consisting of ammonia, nitrogen, and mixtures thereof to provide a ternary ceramic comprising SiC, AlN, and $Si_3N_4$. Other gases such as helium or hydrogen which are known to improve the thermal conductivity of the nitriding atmosphere may also be present.

The present invention is also directed to a composition, i.e., a preceramic composition, composed of an organoaluminum preceramic polymer having a backbone composed of alternating members selected from the group consisting of aluminum-containing groups and nitrogen containing groups, said preceramic polymer backbone containing pendant carbon containing groups, and elemental silicon, which may also include a filler that is, most preferably, silicon carbide.

For purposes of the present invention, the polymers suitable for such processes and compositions comprise an aluminum-nitrogen bond, preferably having a backbone comprising alternating members selected from the group consisting of aluminum containing groups and nitrogen-containing groups. Also for purposes of this invention the aluminum or nitrogen atoms of the suitable polymer contains pendant carbon containing groups. The polymers comprising an aluminum nitrogen bond suitable for purposes of the present invention have a general formula selected from the group of formulae consisting of:

a polymer comprising structural units of general formula (a):

where $n \geq 2$ and R and R''' can be the same or different and are selected from the group consisting of 1-12 carbon alkyl groups, 3-12 carbon cycloalkyl groups, 2-12 carbon alkenyl groups, 3-12 carbon cycloalkenyl groups, aryl groups, and hydrogen, and R' and R'' may be selected from the group consisting of 1-12 carbon alkyl groups, 3-12 carbon cycloalkyl groups, 2-12 carbon alkenyl groups, 3-12 carbon cycloalkenyl groups, aryl groups, amino groups, imino groups, carboxy groups, alkoxy groups, aryloxy groups, and hydrogen, provided that R, R', R'' and R''' are not all hydrogen;

a polymer comprising structural units of general formula (b)

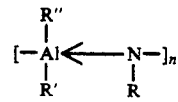

where $n \geq 2$ and R is an imine group, and R' and R'' may be selected from the group consisting of 1-12 carbon alkyl groups, 3-12 carbon cycloalkyl groups, 2-12 carbon alkenyl groups, 3-12 carbon cycloalkenyl groups, aryl groups, amino groups, carboxy groups, alkoxy groups, aryloxy groups, and hydrogen;

a polymer comprising structural units of general formula (c):

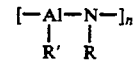

where $n \geq 2$ and R is selected from the group consisting of 1-12 carbon alkyl groups, 3-12 carbon cycloalkyl groups, 2-12 carbon alkenyl groups, 3-12 carbon cycloalkenyl groups, aryl groups, and hydrogen and R' may be selected from the group consisting of 1-12 carbon alkyl groups, 3-12 carbon cycloalkyl groups, 2-12 carbon alkenyl groups, 3-12 carbon cycloalkenyl groups, aryl groups, amino groups, imino groups, carboxy groups, alkoxy groups, aryloxy groups and hydrogen provided that R and R' are not both hydrogen; and general formula (d):

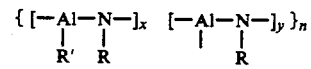

where $n \geq 2$ and R may be selected from the group consisting of 1-12 carbon alkyl groups, 3-12 carbon cycloalkyl groups, 2-12 carbon alkenyl groups, 3-12 carbon cycloalkenyl groups, aryl groups, and hydrogen, and R' may be selected from the group consisting of 1-12 carbon alkyl groups, 3-12 carbon cycloalkyl groups, 2-12 carbon alkenyl groups, 3-12 carbon cycloalkenyl groups, aryl groups, amino groups, imino groups, carboxy groups, alkoxy groups, aryloxy groups, and hydrogen provided that R and R' are not both hydrogen and $x+y \leq 1$. In the group containing y repeat units the aluminum atom is bonded to three nitrogen atoms.

For purposes of the general formulae of the polymers comprising an aluminum nitrogen bond suitable for purposes of the present invention, R, R', R'', and R''' are preferably alkyl or aryl groups. When R, R', R'', and R''' is an alkyl group the preferred alkyl groups have 1-12 carbon atoms; said alkyl groups are selected from the group consisting of methyl, ethyl, propyl, isopropyl, butyl, isobutyl, pentyl, hexyl, heptyl, and octyl groups. When R, R', R'', and R''' is an aryl group the preferred aryl groups are phenyl groups.

For the general formulae (a), (b), (c), and (d) if R, R', R'', and R''' is an organounsaturated group, the organounsaturated organic group is preferably selected from the group consisting of organounsaturated organic groups which are capable of being crosslinked by an energy input, and are more preferably selected from the group consisting of allyl, butenyl, 2-methylpropenyl, and propenyl groups.

DETAILED DESCRIPTION OF THE INVENTION

In accordance with the process of the present invention, ceramic compositions comprising solid solutions or composites, of SiC and AlN are formed by dispersing elemental silicon powder in a ceramic precursor polymer or preceramic polymer containing Al, N and C, shaping the resultant composition, heating the molded product at a temperature sufficient to cause a reaction between the elemental silicon and the polymer to form an intermediate composition, and further heating the resultant intermediate composition to a temperature sufficient to consolidate the intermediate composition to a SiC—AlN solid solution composite ceramic.

As discussed in more detail hereinbelow, the silicon-filled polymers of the present invention may also contain materials which should not interfere with the intended reaction, and are preferably non reactive powders which are either ceramic or metallic, and may be in the form of whiskers, platelets, or continuous fiber. These added materials or components can contribute to the fired properties of the ceramic.

In one embodiment, the silicon filled polymers of the present invention are highly filled with silicon carbide powder, and the polymer is used as a non fugitive, reactive binder, i.e. it converts to reaction product and is largely retained in the sintered ceramic.

In another embodiment, an excess of elemental silicon powder is added to the polymer, and, after formation of the SiC—AlN ceramic, the residual elemental silicon is nitrided in an ammonia- or nitrogen-containing atmosphere to provide a ternary ceramic comprising SiC, AlN, and $Si_3N_4$.

The silicon-filled polymers of the present invention may be shaped by any of a number of methods such as compression molding, cold isostatic pressing, injection molding, extrusion, fiber spinning, tape casting, hot pressing, and slip casting.

A preferred forming technique for these silicon-filled polymer compositions is the fabrication of solid-solution SiC—AlN fiber. J. D. Bolt, S. M. Dinh and L. A. Silverman in U.S. Pat. No. 4,942,011, Jul. 17, 1990, the disclosure of which is hereby incorporated in its entirety by reference thereto herein, disclose the spinning of SiC fiber from a SiC powder-filled polysilazane composition.

The importance of solid-solution ceramics in such an application resides in the ability of such solid solution ceramics to retain strength during high temperature thermal exposure. As described by Kuo and Virkar, J. Am. Cer. Soc., 1990, 73, 2640, solid solution SiC/AlN ceramics exhibited substantially no growth in grain size upon thermal aging. Exaggerated grain growth at elevated temperatures is one cause of material failure in SiC ceramics. Such strength and modulus retention is critical for such high temperature applications as energy conversion devices such as gas turbines, diesel superchargers, Stirling engines, and the like.

Thus, the present invention is also directed to the fabrication of solid solution SiC—AlN ceramic fibers from an elemental silicon filled preceramic polymer containing aluminum, nitrogen, and carbon from which composites exhibiting exceptional mechanical performance at high temperature can be fabricated. Such fibers can be formed by dry or wet spinning methods as well as extrusion. In accordance with this embodiment of the present invention, for example, filaments can be drawn from an alazane preceramic polymer melt containing suspended elemental silicon.

The present invention is discussed in more detail hereinbelow:

I. Polymer Synthesis

The preceramic polymers employed in the practice of the present invention are polymers containing Al, N, and C atoms. Polymers useful in the practice of the present invention are alazane polymers or polyalazanes which include aluminum amide polymers, aluminum imide polymers, and aluminum imine polymers, and polyaminoalanes.

For purposes of the present invention, the ceramic precursor polymer, also referred to herein as a preceramic polymer, is an aluminum based preceramic polymer, such as alazane or polyalazane, having preferred repeat units of the form of general formula (b):

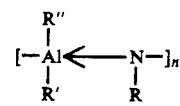

where $n \geq 2$ and R is an imine group, and R' and R'' may be selected from the group consisting of 1-12 carbon alkyl groups, 3-12 carbon cycloalkyl groups, 2-12 carbon alkenyl groups, 3-12 carbon cycloalkenyl groups, aryl groups, amino groups, carboxy groups, alkoxy groups, aryloxy groups, and hydrogen; i.e., at least one group must be carbon containing. R, R' and R'' should have sufficient carbon atoms to react completely with the added elemental silicon powder without resulting in excess carbon in the resultant product. Suitable R', and R'' groups include alkyl groups which include, but are not limited to methyl, ethyl, propyl, isopropyl, butyl, isobutyl, pentyl, hexyl, heptyl, and octyl, and also include aryl groups which include but are not limited to phenyl groups.

In a preferred embodiment of the present invention, R, R' or R'' are organounsaturated organic groups which can be crosslinked by an energy input. Suitable organounsaturated groups include, but are not limited to allyl, methallyl, butenyl, 2-methylpropenyl, and propenyl groups.

In a more preferred embodiment of the invention the preceramic polymer is an alazane polymer or polyalazane having repeat units of the form of general formula (c):

where $n \geq 2$ and R may be selected from the group consisting of 1-12 carbon alkyl groups, 3-12 carbon cycloalkyl groups 2-12 carbon alkenyl groups, 3-12 carbon cycloalkenyl groups, aryl groups, and hydrogen, and R' may be selected from the group consisting of 1-12 carbon alkyl groups, 3-12 carbon cycloalkyl groups, 2-12 carbon alkenyl groups, 3-12 carbon cycloalkenyl groups, aryl groups, amino groups, imino groups, carboxy groups, alkoxy groups, aryloxy groups, and hydrogen provided that R and R' are not both hydrogen;

In the most preferred embodiment of the present invention, the preceramic polymer is an alazane polymer or polyalazane comprising units represented by the general formula (d):

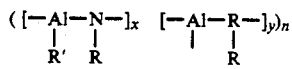

where $n \geq 2$ and R may be selected from the group consisting of 1-12 carbon alkyl groups, 3-12 carbon cycloalkyl groups, 2-12 carbon alkenyl groups, 3-12 carbon cycloalkenyl groups, aryl groups, and hydrogen, and R' may be selected from the group consisting of 1-12 carbon alkyl groups, 3-12 carbon cycloalkyl groups, 2-12 carbon alkenyl groups, 3-12 carbon cycloalkenyl groups, aryl groups, amino groups, imino groups, carboxy groups, alkoxy groups, aryloxy groups, and hydrogen provided that R and R' are not both hydrogen and $x+y \leq 1$. In the group containing y repeat units the aluminum atom is bonded to three nitrogen atoms.

The polymers containing Al, N, and C atoms, i.e., preceramic polymers, useful in the practice of the present invention may be produced using any method for producing aluminum-nitrogen polymers in which at least some of the repeating units contain alternating aluminum and nitrogen atoms wherein each aluminum and nitrogen atom is substituted by an organic group, for example, as disclosed in commonly owned, co pending application U.S. Ser. No. 07/594,754, filed in the name of Jensen on or about Oct. 9, 1990, the disclosure of which is incorporated in its entirety by reference thereto herein.

II. First Stage Reaction To Produce An Intermediate Reaction Product Having A Carbon-Silicon Bond With the foregoing in mind, the present invention is directed to a process which includes an initial reaction stage wherein an intermediate composition is prepared by reacting a previously described polymer comprising aluminum, nitrogen, and carbon with elemental silicon in predetermined proportions in specific atmospheres and at a temperature sufficient to form a reaction product, i.e., intermediate composition, having carbon-silicon bonds.

For the process of the present invention, the initial stage of the reaction is performed at an initial temperature including a temperature within a temperature range having an upper limit of less than about 1650° C., and preferably within the range of about 400° C. to about 1650° C.; and in an atmosphere which is non-oxidizing.

The proportion of powdery elemental silicon and preceramic polymer must be provided in amounts to yield the proper proportion of silicon carbide and aluminum nitride for the desired ceramic product.

It is important to note, in this regard, that different alazane polymers have different aluminum, nitrogen, and carbon contents and often adjustments in mass ratio must be made to account for such stoichiometries as well as excess carbon which may be lost during thermolysis of the polymer in the processing steps.

Although not wishing to be bound by any particular theory, the elemental silicon is believed to undergo a low temperature reaction with carbon from the preceramic polymer to form this intermediate composition. Representative equations for this transformation are shown in general formula (4) and general formula (5) below. The species R"—Si≡ represents an intermediate composition in which a carbon silicon bond has formed (designated by R"—Si) and the remaining valences of silicon are shown as Si≡. The designation R"—Si does not necessarily indicate that an entire hydrocarbon group is bound to silicon, but rather that a silicon-carbon bond has formed.

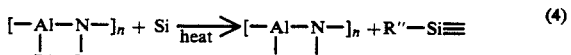

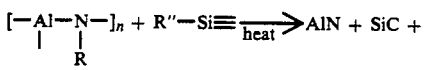

gaseous by-products

Again, not wishing to be bound by any particular theory, it is believed that alternative routes may exist over the entire pyrolysis temperature range which provide the initial silicon-carbon bond forming sequence in the formation of silicon carbide.

III. Second Stage Reaction To Produce A Ceramic

The previously described preceramic polymers can be pyrolyzed at a temperature of at least 800° C. under an inert atmosphere, e.g., hydrogen, nitrogen, helium, argon, ammonia, or hydrazine-containing atmosphere, to yield a silicon carbide-containing ceramic material.

More specifically, in the second stage of the process of the present invention, the previously formed reaction product, i.e., the intermediate composition, is subjected to a higher temperature than the initial temperature for an additional time sufficient to form a ceramic composition comprising aluminum nitride and silicon carbide in proper proportions for desired stoichiometry. In this stage, the higher temperature includes a temperature within a higher temperature range having an upper limit of about 2300° C., and preferably, within a temperature range of about 1650° C. to about 2200° C. and the atmosphere is a non-oxidizing atmosphere.

In accordance with the present invention, the initial step of reacting effects a chemical disproportionation of the polymer in the presence of the elemental silicon and concomitant formation of silicon-carbon bonds; and the subsequent step of subjecting to the higher temperature effects a sintering of the reaction product to produce a dense ceramic.

The resultant ceramic may be composed of stoichiometric proportions of silicon carbide and aluminum nitride in a form selected from the group consisting of a solid-solution and a composite, the latter preferably being a microcomposite.

IV. Polymer as Binder for Silicon Carbide

As mentioned above, silicon filled polymers of the present invention may also contain materials which should not interfere with the intended reaction, and are preferably non reactive powders which are either ceramic or metallic, and may be in the form of whiskers, platelets, or continuous fiber. Suitable fillers include, for example, SiC, $Si_3N_4$, $SiO_2$, BN, AlN, $Al_2O_3$, TiN, TiC, Ti, Zr, ZrC, $ZrO_2$, $B_4C$ and $Y_2O_3$. These added materials or components can contribute to the fired properties of the ceramic. When such fillers are used, they may be present in an amount such that after sintering no more than about 50 wt % of the total sintered article comprises the filler. The preceramic polymers of the present invention are particularly suited for sintering and subsequent densification of silicon carbide.

In a preferred embodiment, the silicon filled polymers of the present invention are highly filled with silicon carbide powder, and the silicon filled polymer is used as a reactive binder. In such a preferred embodiment of this invention, SiC is used as a filler in the preceramic polymers of the present invention, and may be present in an amount of from about 1 wt %-90 wt % of the total precursor/SiC mixture. $\alpha$-SiC, $\beta$-SiC, and mixtures thereof may be used. Additionally, mixtures of the preceramic polymer with SiC and other ceramic or metal fillers may be used. When present, the SiC and other ceramic or metal fillers must provide enough SiC so that the sintered article contains at least about 50 wt % SiC.

In accordance with the present invention, silicon carbide may be consolidated by a process which involves heating a mixture of silicon carbide, elemental silicon and the alazane polymer under pyrolysis conditions at a temperature and for a time sufficient to produce a sintered silicon carbide article. The silicon carbide is preferably selected from the group consisting of $\alpha$-SiC, $\beta$-SiC and mixtures thereof. The temperatures suitable for this purpose are at least about 1500° C., and most preferably at least about 1900° C. and the heating is continued for a time sufficient to produce a silicon carbide article with a density which is preferably greater than about 90% of theoretical density.

In accordance with the present invention, silicon carbide thus may be sintered on a local scale (100 $\mu$m) at a temperature of at least about 1600° C., and densified at a temperature of at least about 1900° C., and most preferably above about 2050° C. to about 2200° C.

As used herein, sintering means the process in which two adjacent ceramic grains become physically connected. There have been many mechanisms postulated for this, not all of which result in densification. All sintering mechanisms rely upon movement of matter in order to connect adjacent grains. Densification means the increase of matter in a specific volume, or a decrease of the void space. Although often used synonymously, the terms sinter and densify, as found in this specification, have specific, and different meanings.

V. Production of a Ternary Ceramic

In another embodiment, an excess of elemental silicon powder is added to the polymer and, after formation of the SiC—AlN ceramic, the residual elemental silicon is nitrided in an ammonia-or nitrogen-containing atmosphere to provide a ternary ceramic comprising SiC, AlN, and $Si_3N_4$.

VI. Formation of Shaped Ceramic Articles

Mixtures of SiC powder and/or additional fillers with the previously described preceramic polymers used in accordance with the present invention may be prepared using standard ceramic mixing equipment which includes, but is not limited to, a ball mill, a double planetary mixer, a three roll mill, a sigma blade mixer, a ribbon blender, an extruder and other methods known to those skilled in the art.

Mixtures of the preceramic polymers used in accordance with the present invention and fillers may be molded by processes including, but not limited to, dry pressing, tape casting, isostatic pressing, extrusion and injection molding. Because each of these molding operations requires a different amount of the preceramic polymers, the amounts thereof may be tailored so that the overall composition of the system, i.e., the preceramic polymer binder, SiC powder and other fillers, is appropriate to sinter the silicon carbide.

For example, injection molding requires about 10 wt %-50 wt % polymer.

Pyrolysis of the mixture must be conducted in a nonoxidizing atmosphere, such as nitrogen, argon, helium, hydrogen, ammonia, and the like. The pyrolysis at temperatures from about 400° C. to about 1600° C. produces an intermediate composition containing silicon carbon bonds. The intermediate composition contains carbon, silicon, aluminum, and nitrogen. Further heating, to temperatures of at least about 1600° C. to about 1800° C., will crystallize the ceramic. Additional heating at temperatures of at least about 1800° C. to about 2200° C., may be required to fully densify the molded article. As used herein, "fully densify" means to attain a density that is about 90% or greater of the theoretical density of single crystal silicon carbide.

EXAMPLES

The following are presented as non limiting examples to illustrate the present invention.

Examples 1-3 are directed to the preparation of the polymer.

EXAMPLE 1

A 250 ml Schlenk round bottom flask is fitted with a pressure equalized dropping addition funnel and purged. Acetonitrile (50 ml, 946 mmol) is added to the flask. The funnel is charged with diisobutylaluminum hydride (100 ml, 1.0M in toluene, 100 mmol) and the flask is cooled to 0° C. The diisobutylaluminum hydride is added dropwise over thirty minutes and stirred at 0° C. for an additional hour. The flask is warmed to room temperature and the colorless solution is stirred overnight. The solvent is removed under vacuum, leaving 18 g of the aluminum imine $[CH_3C(H)=NAl(i-C_4H_9)_2]_2$. The aluminum imine (5.0 g) is heated at 180° C. to 200° C. for eight hours to form 3.5 grams of the viscous red orange colored alazane polymer $[—(CH_3CH_2)NAl(C_4H_9)—]_m[—(CH_3CH_2)NAl(C_4H_7)—]_n$.

EXAMPLE 2

Five grams of the aluminum imine, [CH$_3$C(H)=NAl(i—C$_4$H$_9$)$_2$]$_2$, prepared as in Example 1, is heated from room temperature to 300° C. over 1.5 hours and held at 300° C. for 4 hours. Upon cooling 2.9 grams of solid red orange colored alazane polymer, [—(C$_2$H$_5$)NAl(C$_4$H$_9$)—]$_{0.65}$[—(C$_2$H$_5$)NAl —]$_{0.35}$, is obtained.

EXAMPLE 3

A 250 ml Schlenk round bottom flask is fitted with a pressure equalized dropping addition funnel and purged. Benzonitrile (6.44 ml, 63 mmol) and toluene (25 ml) are added to the flask. The funnel is charged with diisobutylaluminum hydride (50 ml, 1.0M in toluene, 50 mmol) and the flask is cooled to 0° C. The diisobutylaluminum hydride is added dropwise over forty minutes, stirred at 0° C. for an additional thirty minutes, warmed to room temperature and stirred for sixteen hours. Removal of the solvent under vacuum yields 6.9 grams of the yellow liquid product [C$_6$H$_5$C(H)=NAl(i—C$_4$H$_9$)$_2$]$_2$. The aluminum imine [C$_6$H$_5$C(H)=NAl(i—C$_4$H$_9$)$_2$]$_2$ is heated to 180°-200° C. under nitrogen for eight hours to form the viscous red-brown colored alazane polymer [—(C$_6$H$_5$CH$_2$)NAl(C$_4$H$_9$)—]$_m$[—(C$_6$H$_5$CH$_2$)NAl(C$_4$H$_7$)—]$_n$.

Examples 4, 5, 6, and 7 are directed to the preparation of preceramic mixtures of alazane polymers and elemental silicon in accordance with the present invention using different ratios of Si.

EXAMPLE 4

Silicon powder 0.33 grams was mixed into 3.1 grams of the alazane polymer [—(CH$_3$CH$_2$)NAl(C$_4$H$_9$)—]$_m$[—(CH$_3$CH$_2$)NAl(C$_4$H$_7$)—]$_n$ prepared as described in Example 1. The mixture was fired in argon from room temperature to 1500° C. and held at temperature for two hours. X-ray powder diffraction analysis of the resulting ceramic showed crystalline aluminum nitride and silicon carbide to be present.

EXAMPLE 5

Silicon powder, 1.32 grams, was mixed with 3.0 grams of the alazane polymer [—(CH$_3$CH$_2$)NAl(C$_4$H$_9$)—]$_m$[—(CH$_3$CH$_2$)NAl(C$_4$H$_7$)—]$_n$ prepared as described in Example 1. The mixture was fired in argon from room temperature to 1500° C. and held at temperature for two hours. X-ray powder diffraction analysis of the pyrolyzed product showed crystalline aluminum nitride and silicon carbide as well as elemental silicon to be present.

EXAMPLE 6

Silicon powder, 0.74 grams, was mixed with 5.0 grams of the alazane polymer [—(C$_6$H$_5$CH$_2$)NAl(C$_4$H$_9$)—]$_m$[—(C$_6$H$_5$CH$_2$)NAl(C$_4$H$_7$)—]$_n$ prepared as described in Example 3. The mixture was fired in argon from room to 1600° C. and held for two hours. X-ray powder diffraction analysis of the fired product showed crystalline silicon carbide and aluminum nitride.

EXAMPLE 7

The aluminum imide polymer [C$_2$H$_5$AlNH]$_x$ was prepared by treating 12 ml of 1.9M triethylaluminum with excess ammonia at room temperature to form 2.6 grams of liquid [(C$_2$H$_5$)$_2$AlNH$_2$]$_3$. The [(C$_2$H$_5$)$_2$AlNH$_2$]$_3$ is heated from room temperature to 130° C. for 2 hours resulting in 1.9 grams of the solid white aluminum imide polymer [C$_2$H$_5$AlNH]$_x$. The aluminum imide polymer [C$_2$H$_5$AlNH]$_x$ (1.9 grams) was mixed with 0.35 grams of silicon powder. The mixture was fired to 1500° C. in argon for two hours. The X-ray powder diffraction pattern shows crystalline β-SiC and AlN to be present.

Examples 8, 9, and 10 are illustrative of the process of the present invention using non reactive fillers (Examples 8 and 9), and reactive fillers (Example 10).

EXAMPLE 8

Silicon powder, 0.66 grams, and titanium carbide, 0.70 grams, were mixed with 3.0 grams of the alazane polymer [—(CH$_3$CH$_2$)NAl(C$_4$H$_9$)—]$_m$[—(CH$_3$CH$_2$)NAl(C$_4$H$_7$)—]$_n$ prepared as described in Example 1. The mixture was fired in argon from room temperature to 1500° C. and held at temperature for two hours. X-ray powder diffraction analysis of the pyrolyzed material showed crystalline silicon carbide, titanium carbide and aluminum nitride.

EXAMPLE 9

Silicon powder, 0.66 grams, and alumina, 1.2 grams, were mixed with 3.0 grams of the alazane polymer [—(CH$_3$CH$_2$)NAl(C$_4$H$_9$)—]$_m$[—(CH$_3$CH$_2$)NAl(C$_4$H$_7$)—]$_n$ prepared as described in Example 1. The mixture was fired in argon from room temperature to 1500° C. and held at temperature for two hours. X-ray powder diffraction analysis of the pyrolyzed material showed crystalline silicon carbide, aluminum nitride and alumina.

EXAMPLE 10

Silicon powder, 0.2 grams, and titanium disilicide, 0.6 grams, were mixed with 3.0 grams of the alazane polymer [—(CH$_3$CH$_2$)NAl(C$_4$H$_9$)—]$_m$[—(CH$_3$CH$_2$)NAl(C$_4$H$_7$)—]$_n$ prepared as described in Example 1. The mixture was fired in argon from room temperature to 1500° C. and held at temperature for two hours. X-ray powder diffraction analysis of the pyrolyzed material showed crystalline AlN, α- and β-SiC and TiC. No TiSi$_2$ was evident in the x-ray pattern.

Example 11 shows the use of SiC as a filler.

EXAMPLE 11

Silicon powder, 0.4 grams, and silicon carbide, 0.5 grams, were mixed with 3.0 grams of the alazane polymer [—(C$_2$H$_5$)NAl(C$_4$H$_9$)—]$_{0.65}$[—(C$_2$H$_5$)NAl—]$_{0.35}$ prepared as described in Example 2. The mixture was fired in argon from room temperature to 1500° C. and held two hours. X-ray powder diffraction analysis of the pyrolyzed material showed crystalline AlN and SiC as the only phases present.

Example 12 shows the preparation of a molded shape.

EXAMPLE 12

Silicon powder, 0.13 grams, was mixed with 0.5 grams of the alazane polymer [(C$_2$H$_5$)NAl(C$_4$H$_9$)]$_{0.65}$[(C$_2$H$_5$)NAl]$_{0.35}$ prepared as described in Example 2. Fibers were drawn from the melt.

Example 13 shows the preparation of a compression molded shape from a composition in accordance with the present invention.

EXAMPLE 13

The alazane polymer [—(C$_2$H$_5$)NAl(C$_4$H$_9$)—]$_{0.65}$[—(C$_2$H$_5$)NAl—]$_{0.35}$ prepared as described in Example 2 (2.0 grams) was mixed with silicon powder (0.5 grams). Pellets were compression molded at room temperature and 2000 psi. The molded pellets were cured by treating with gaseous ammonia at room temperature. The cured pellets were pyrolyzed by heating from room temperature to 1500° C. The fired pellets retained their molded shape during pyrolysis.

Example 14 illustrates the present invention wherein an excess of elemental silicon is used and wherein the process includes a nitriding step.

EXAMPLE 14

Silicon powder, 0.68 grams, was mixed with 3.0 grams of the alazane polymer [—(CH$_3$CH$_2$)NAl(C$_4$H$_9$)—]$_m$[—(CH$_3$CH$_2$)NAl(C$_4$H$_7$)—]$_n$ prepared as described in Example 1. The mixture was fired from room temperature to 1300° C. at 10° C./min in argon in a mullite tube furnace with a 2 hour hold at 1300° C. The pyrolysis atmosphere was switched to N$_2$ and the temperature increased at 10° C./min from 1300° to 1500° C., and the temperature was held 8 hours at 1500° C. X-ray powder diffraction analysis of the pyrolyzed material showed crystalline silicon carbide, silicon nitride, and aluminum nitride.

EXAMPLE 15

A 250 ml Schlenk round bottom flask is fitted with a pressure equalized dropping addition funnel and purged. 3-Butenenitrile (4.4 grams, 65.6 mmol) is added to the flask. The funnel is charged with diisobutylaluminum hydride (60 ml, 1.0M in toluene, 60 mmol) and the flask is cooled to 0° C. The diisobutylaluminum hydride is added dropwise over thirty minutes, stirred at 0° C. for an additional thirty minutes, warmed to room temperature and stirred for sixteen hours. Removal of the solvent under vacuum yields the yellow liquid product [CH$_2$=CHCH$_2$C(H)=NAl(i—C$_4$H$_9$)$_2$]$_2$. To 0.5 grams of [CH$_2$=CHCH$_2$C(H)=NAl(i—C$_4$H$_9$)$_2$]$_2$ was added 0.5 grams silicon powder and the mixture was heated in a test tube under nitrogen to 200° C. to thermally crosslink the polymer. The solid crosslinked silicon-containing polymer plug was removed from the test tube and fired in a mullite tube furnace from room temperature to 1500° C. at 10° C./min in an argon atmosphere with a 2 hour hold at 1500° C.

Although the invention has been described with reference to particular means, materials and embodiments, from the foregoing, one skilled in the art can easily ascertain the essential characteristics of the present invention; and various changes and modifications may be made to various usages and conditions without departing from the spirit and scope of the invention as described in the claims that follow.

What is claimed is:

1. A process for preparing a composition, said process comprising:
reacting a composition comprising a mixture of elemental silicon and a polymer comprising aluminum, nitrogen, and carbon in an atmosphere at a temperature sufficient to form a refractory reaction product comprising silicon-carbon bonds and aluminum-nitrogen bonds, wherein said polymer comprising aluminum, nitrogen and carbon has a general formula selected from the group of formulae consisting of:

where n>2 and R and R''' can be the same or different and are selected from the group consisting of 1-12 carbon alkyl groups, 3-12 carbon cycloalkyl groups, 2-12 carbon alkenyl groups, 3-12 carbon cycloalkenyl groups, aryl groups, and hydrogen, and R' and R'' may be selected from the group consisting of 1-12 carbon alkyl groups, 3-12 carbon cycloalkyl groups, 2-12 carbon alkenyl groups, 3-12 carbon cycloalkenyl groups, aryl groups, amino groups, imino groups, carboxy groups, alkoxy groups, aryloxy groups, and hydrogen, provided that R, R', R'' and R''' are not all hydrogen;

where n>2 and R is an imine group, and R' and R'' may be selected from the group consisting of 1-12 carbon alkyl groups, 3-12 carbon cycloalkyl groups, 2-12 carbon alkenyl groups, 3-12 carbon cycloalkenyl groups, aryl groups, amino groups, carboxy groups, alkoxy groups, aryloxy groups, and hydrogen, provided that R, R' and R'' are not all hydrogen;

where n>2 and R is selected from the group consisting of 1-12 carbon alkyl groups, 3-12 carbon cycloalkyl groups, 2-12 carbon alkenyl groups, 3-12 carbon cycloalkenyl groups, aryl groups, and hydrogen, and R' is selected from the group consisting of 1-12 carbon alkyl groups, 3-12 carbon cycloalkyl groups, 2-12 carbon alkenyl groups, 3-12 carbon cycloalkenyl groups, aryl groups, amino groups, imino groups, carboxy groups, alkoxy groups, and aryloxy groups; and

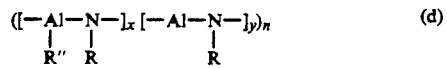

where n>2 and R is selected from the group consisting of 1-12 carbon alkyl groups, 3-12 carbon cycloalkyl groups, 2-12 carbon alkenyl groups, 3-12 carbon cycloalkenyl groups, aryl groups, and hydrogen, and R' is selected from the group consisting of 1-12 carbon alkyl groups, 3-12 carbon cycloalkyl groups, 2-12 carbon alkenyl groups, 3-12 carbon cycloalkenyl groups, aryl groups, amino groups, imino groups, carboxy groups, alkoxy groups, aryloxy groups and hydrogen provided that R and R' are not both hydrogen and x+y<1, and in the group containing y repeat units the aluminum atom is bonded to three nitrogen atoms.

2. The process of claim 1, wherein said elemental silicon is silicon powder.

3. The process of claim 1 wherein said polymer comprising aluminum, nitrogen and carbon has the general formula:

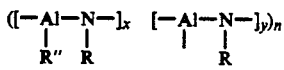

wherein n≧2 and R is selected from the group consisting of 1-12 carbon alkyl groups, 3-12 carbon cycloalkyl groups, 2-12 carbon alkenyl groups, 3-12 carbon cycloalkenyl groups, aryl groups, and hydrogen, and R' is selected from the group consisting of 1-12 carbon alkyl groups, 3-12 carbon cycloalkyl groups, 2-12 carbon alkenyl groups, 3-12 carbon cycloalkenyl groups, aryl groups, amino groups, imino groups, carboxy groups, alkoxy groups, aryloxy groups, and hydrogen provided that R and R' are not both hydrogen and x+y≦1, and in the group containing y repeat units the aluminum atom is bonded to three nitrogen atoms.

4. The process of claim 1, wherein said alkyl groups are selected from the group consisting of methyl, ethyl, isopropyl, butyl, isobutyl, pentyl, hexyl, and heptyl groups.

5. The process of claim 1, wherein said cycloalkenyl groups are selected from the group consisting of organounsaturated groups which are capable of being crosslinked by an energy input.

6. The process of claim 1, wherein said alkenyl groups are selected from the group consisting of organounsaturated groups which are capable of being crosslinked by an energy input.

7. The process of claim 6, wherein said organounsaturated groups are selected from the group consisting of allyl, methallyl, butenyl, 2-methylpropenyl, and propenyl groups.

8. The process of claim 1, wherein said atmosphere is a nonoxidizing atmosphere.

9. The process of claim 8, wherein said nonoxidizing atmosphere is selected from the group consisting of an argon-containing atmosphere, and a nitrogen-containing atmosphere.

10. The process of claim 1, wherein said reaction temperature is a temperature of up to about 1650° C.

11. The process of claim 10, wherein said reaction temperature is a temperature between about 400° C. and about 1650° C.

12. The process of claim 1, wherein said refractory reaction product comprising silicon carbon bonds and aluminum-nitrogen bonds comprises a mixture of silicon carbide and aluminum nitride.

13. The process of claim 12, wherein said mixture of silicon carbide and aluminum nitride comprises a mixture of beta-silicon carbide and aluminum nitride.

14. The process of claim 1, further comprising heating said refractory reaction product in an atmosphere at a temperature sufficient to sinter said refractory reaction product and form a sintered refractory reaction product.

15. The process of claim 14, wherein said atmosphere is a nonoxidizing atmosphere.

16. The process of claim 15, wherein said nonoxidizing atmosphere is selected from the group consisting of an argon-containing atmosphere and a nitrogen-containing atmosphere.

17. The process of claim 14, wherein said temperature sufficient to sinter is a temperature between about 1650° C. and about 2200° C.

18. The process of claim 17, wherein said temperature sufficient to sinter is a temperature between about 1900° C. and about 2200° C.

19. The process of claim 14, wherein said sintered refractory reaction product comprises a sintered composite of alpha-silicon carbide and aluminum nitride.

20. The process of claim 19, wherein said sintered composite of alpha-silicon carbide and aluminum nitride comprises a microcomposite of alpha-silicon carbide and aluminum nitride.

21. The process of claim 14, wherein said sintered refractory reaction product comprises a solid solution of alpha-silicon carbide and aluminum nitride.

22. The process of claim 1, wherein said composition comprises a sufficient excess of said elemental silicon to result in said refractory reaction product which contains unreacted elemental silicon.

23. The process of claim 22, wherein said refractory reaction product is heated in an atmosphere comprising a member selected from the group consisting of ammonia and nitrogen and mixtures thereof to provide a ternary ceramic comprising silicon carbide, aluminum nitride, and silicon nitride.

24. A composition comprising a mixture of elemental silicon and a polymer comprising aluminum, nitrogen and carbon, wherein said polymer comprising aluminum, nitrogen and carbon has a general formula selected from the group of formulae consisting of:

wherein n>2 and R and R''' can be the same or different and are selected from the group consisting of 1-12 carbon alkyl groups, 3-12 carbon cycloalkyl groups, 2-12 carbon alkenyl groups, 3-12 carbon cycloalkenyl groups, aryl groups, and hydrogen, and R' and R'' may be selected from the group consisting of 1-12 carbon alkyl groups, 3-12 carbon cycloalkyl groups, 2-12 carbon alkenyl groups, 3-12 carbon cycloalkenyl groups, aryl groups, amino groups, imino groups, carboxy groups, alkoxy groups, aryloxy groups, and hydrogen, provided that R, R', R'' and R''' are not all hydrogen;

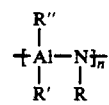 (b)

wherein n>2 and R is an imine group, and R' and R'' may be selected from the group consisting of 1-12 carbon alkyl groups, 3-12 carbon cycloalkyl groups, 2-12 carbon alkenyl groups, 3-12 carbon cycloalkenyl groups, aryl groups, amino groups, carboxy groups, alkoxy groups, aryloxy groups, and hydrogen, provided that R, R' and R'' are not all hydrogen;

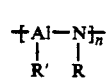 (c)

where n>2 and R is selected from the group consisting of 1-12 carbon alkyl groups, 3-12 carbon cycloalkyl groups, 2-12 carbon alkenyl groups, 3-12 carbon cycloalkenyl groups, aryl groups, and hydrogen, and R' is selected from the group consisting of 1-12 carbon alkyl groups, 3-12 carbon cycloalkyl groups, 2-12 carbon alkenyl groups, 3-12 carbon cycloalkenyl groups, aryl groups, amino groups, imino groups, carboxy groups, alkoxy groups, and aryloxy groups; and

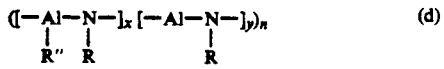 (d)

where $n>2$ and R is selected from the group consisting of 1-12 carbon alkyl groups, 3-12 carbon cycloalkyl groups, 2-12 carbon alkenyl groups, 3-12 carbon cycloalkenyl groups, aryl groups, and hydrogen, and R' is selected from the group consisting of 1-12 carbon alkyl groups, 3-12 carbon cycloalkyl groups, 2-12 carbon alkenyl groups, 3-12 carbon cycloalkenyl groups, aryl groups, amino groups, imino groups, carboxy groups, alkoxy groups, aryloxy groups and hydrogen provided that R and R' are not both hydrogen and $x+y<1$, and in the group containing y repeat units the aluminum atom is bonded to three nitrogen atoms.

25. The process of claim 24 wherein said polymer comprising aluminum, nitrogen and carbon has the general formula:

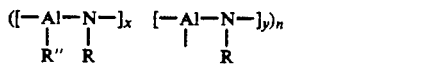

where $n \geq 2$ and R is selected from the group consisting of 1-12 carbon alkyl groups, 3-12 carbon cycloalkyl groups, 2-12 carbon alkenyl groups, 3-12 carbon cycloalkenyl groups, aryl groups, and hydrogen, and R' is selected from the group consisting of 1-12 carbon alkyl groups, 3-12 carbon cycloalkyl groups, 2-12 carbon alkenyl groups, 3-12 carbon cycloalkenyl groups, aryl groups, amino groups, imino groups, carboxy groups, alkoxy groups, aryloxy groups, and hydrogen provided that R and R' are not both hydrogen and $x+y \leq 1$, and in the group containing y repeat units the aluminum atom is bonded to three nitrogen atoms.

26. The composition of claim 24, wherein said alkyl groups are selected from the group consisting of methyl, ethyl, propyl, isopropyl, butyl, isobutyl, pentyl, hexyl, and heptyl groups.

27. The composition of claim 24, wherein said alkenyl groups are selected from the group consisting of organounsaturated groups which are capable of being crosslinked by an energy input.

28. The composition of claim 24, wherein said cycloalkenyl groups are selected from the group consisting of organounsaturated groups which are capable of being crosslinked by an energy input.

29. The composition of claim 28, wherein said organo-unsaturated groups are selected from the group consisting of allyl, butenyl, 2-methylpropenyl, and propenyl groups.

30. The composition of claim 24, further comprising a filler.

31. The composition of claim 30, wherein said filler comprises a member selected from the group consisting of alpha-silicon carbide, beta-silicon carbide, and mixtures thereof.

32. The composition of claim 30, wherein said filler comprises aluminum nitride.

33. The composition of claim 30, wherein said filler comprises a sintering aid.

34. The composition of claim 33, wherein said sintering aid comprises a member selected from the group consisting of yttrium oxide, calcium oxide, and aluminum oxide.

* * * * *